United States Patent [19]

Hartman

[11] 4,190,365
[45] Feb. 26, 1980

[54] OPTICAL TESTING OF SURFACE FLATNESS

[76] Inventor: Calvin J. Hartman, Box 763, Clute, Tex. 77531

[21] Appl. No.: 847,244

[22] Filed: Oct. 31, 1977

[51] Int. Cl.$^2$ .............................................. G01B 9/02
[52] U.S. Cl. .................................... 356/352; 356/359
[58] Field of Search ............... 356/109, 112, 352, 359

[56] References Cited

U.S. PATENT DOCUMENTS

| 3,065,663 | 11/1962 | Donnelly et al. | 356/109 |
| 3,891,320 | 6/1975 | Kimura et al. | 356/109 |

OTHER PUBLICATIONS

Edenholm et al., "A Combined Multiple—Beam and Two—Beam Microinterferometer for Surface Topography Measurements," *L'Optique en Metrologie*, Mollet, ed., Pergamon Press, 1960.

*Primary Examiner*—John K. Corbin
*Assistant Examiner*—Matthew W. Koren

[57] ABSTRACT

Surface flatness of a machined work piece, such as a mechanical seal, is determined by placing the surface to be tested against the top surface of a horizontally-disposed "optical flat", projecting monochromatic light rays, such as from a helium lamp, downwardly onto the work piece and the optical flat, and viewing the light rays reflected from the interface of the optical flat and the surface to be tested, by use of a reflective surface placed below the optical flat.

10 Claims, 3 Drawing Figures

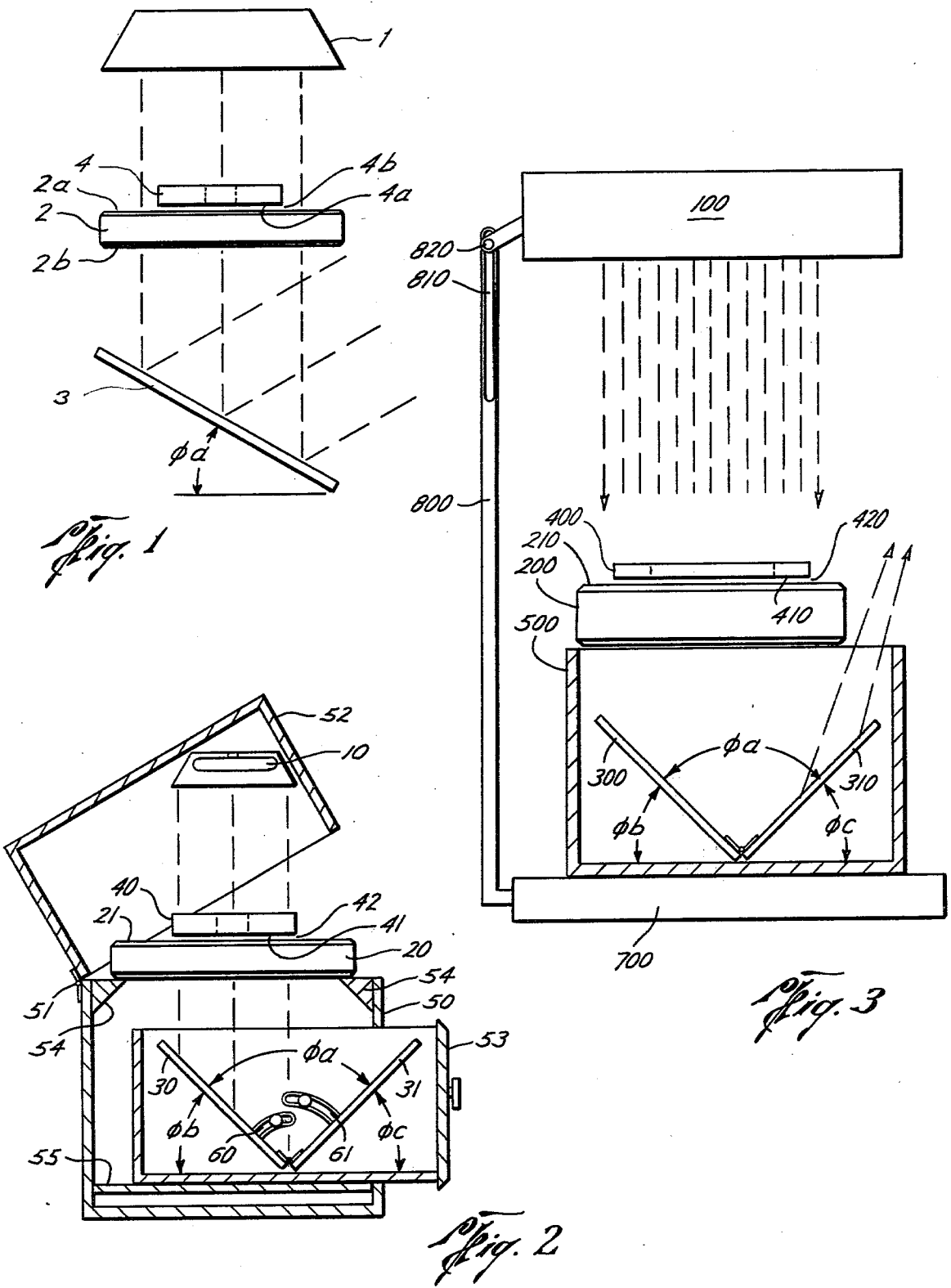

OPTICAL TESTING OF SURFACE FLATNESS

BACKGROUND OF THE INVENTION

In order to provide close fitting of flat surfaces of various mechanical work pieces, such as mechanical seals, it is desirable to provide a means for testing the flatness of such surfaces without having to rely on the trial and error method of actually installing the work piece in its expected operation to see if it works properly. Quite often the testing of the flat surface is desired to be performed at some distance remote from its intended installation.

The present invention provides a new, improved means and method of testing the flatness of the surface of a work piece, involving the commonly-known "optical flat" technique.

DESCRIPTION OF PRIOR ART

Representative patent art pertaining to the testing of flat surfaces is found, for example, in U.S. Pat. Nos. 2,695,544; 2,867,149; 3,185,022; 3,314,328; 3,734,626; and 3,815,998.

U.S. Pat. No. 2,695,544 teaches the use of a dye solution between the work piece surface and a transparent plate, the color intensity of the dye solution correlating to differences in distance between the work piece and the plate.

U.S. Pat. No. 2,867,149 involves the use of a grating at an acute angle from the surface to be tested whereby a collimated light source projects shadows of the grating lines onto the test surface. Irregularities in the line shadows indicate the amount of unevenness or non-flatness of the test surface.

U.S. Pat. No. 3,185,022 teaches the use of a two-ply optical testing gage whereby the ply placed against the test surface is a transparent member which supports an opaque member having a plurality of holes. Where the test surface is free of imperfections, light rays will reflect back through the holes; where there are imperfections in the test surface, causing a gap between the test surface and the transparent member, the light is occluded by the opaque portions of the gage.

U.S. Pat. No. 3,314,328 teaches the use of a collimated, monochromatic light which is projected in a generally upward direction. Light rays passing through a grid containing closely spaced grid lines are projected onto the surface to be tested as the test surface rests on a transparent plate which rests on the grid. The grid lines are observed in a mirror positioned lower than the grid.

U.S. Pat. No. 3,734,626 teaches the use of a laser beam to scan the surface of a disc to determine flatness or imperfections.

U.S. Pat. No. 3,815,998 teaches the use of collimated light and a collecting lens in a system and method for forming topographic contrast representations of a surface.

One of the commonly used devices for testing the surface of a work piece, such as a mechanical seal, is one wherein a monochromatic light (e.g., a helium lamp) shines through an "optical flat" which rests on top of the work piece. In such devices, the work piece rests on a supporting means with the surface to be tested facing upward. The optical flat is then placed on top of that and the full weight of the optical flat is borne by the work piece. The light reflecting back up through the optical flat from the work piece is viewed by looking directly down into the optical flat. "Optical flats" are thick plates of high grade optical glass having highly polished parallel surfaces; they come in various sizes and are often quite heavy compared to the work piece to be tested. When the work piece is relatively thin or is made of a material or of a design which renders it even slightly deformable when the heavy optical flat is placed on it, erroneous or misleading "readings" may occur. Also, it is usual practice to keep several sizes of optical flats available in order to provide a size appropriate to the size of the work piece to be tested. These optical flats are relatively expensive, and it would be an economic advantage to avoid having to keep several sizes on hand.

The use of optical flat testing, and the scientific explanation of how they operate, is discussed quite well in *The New American Machinists Handbook*, edited by Rupert LeGrand, published by McGraw-Hill Book Company, Inc., 1955. In the handbook there is a section on "Optical Flats" on pp. 34-14 to 34-19. There it is explained that an optical flat has two parallel surfaces, one of which is polished for clear vision and the other is ground optically flat. The optically flat surface is the one against which the workpiece to be tested is placed. It is also explained there that when the two surfaces (workpiece and optical flat) are brought together, there is a very thin layer of air between them. Monochromatic light rays reflecting from the glass/air interface and the workpiece/air interface create the phenomenon of interference bands which are viewed as dark lines. If the workpiece is flat, the bands are viewed as straight parallel lines. If the workpiece is convex or concave, the bands are curved. The greater the convexity or concavity, the greater is the curvature of the bands. The article also shows the formulae and measurements for conversion of bands from monochromatic light sources such as Helium, Sodium, and Mercury lamps and teaches a preference for Helium lamps because they are more easily and safely replaced and require no filters to get sharp bands. The "optical flat" method is believed to be the method most pertinent to the present invention.

It is an object of the present invention to improve the flatness testing of workpieces using the well-known optical flat system by providing a means and method whereby the weight of the optical flat does not rest on the surface to be tested thereby deforming, in some cases, the workpiece and giving erroneous or misleading readings.

It is another object to improve the optical flat method of testing flat surfaces by providing a method and means which is useful for a wide variety of workpiece sizes, thereby reducing the number of different sizes of optical flats needed for testing a wide array of workpieces.

Yet another object is to improve the visual observation of the workpiece during optical flat testing by providing adjustable reflection means for the visual observation.

These and other objects will be apparent to practitioners of the relevant arts from the present disclosure.

SUMMARY OF THE INVENTION

The present apparatus comprises, in operable combination, an optical flat positioned substantially horizontally with an optically flat surface facing upward, a monochromatic light source positioned above the optical flat, and a reflective means positioned below the optical flat at an angle to provide easy viewing of the underside of the optical flat.

The present method comprises (a) placing a workpiece on the top surface of a horizontally-disposed optical flat with the surface of the workpiece to be tested being in contact with the optically flat surface of the optical flat, (b) shining a monochromatic light down onto the workpiece and optical flat, and (c) viewing the optical flat from its underside by the use of a reflective means placed below the optical flat, thereby obtaining a visual indication of the flatness of the workpiece surface.

DETAILED DESCRIPTION OF THE INVENTION

Throughout this disclosure the term "optical flat" refers to relatively thick slabs, sheets, or plates of high quality optical glass having highly polished parallel surfaces, with at least one of the surfaces being optically flat. Generally, optical flats are circular, but it is not necessary that they be circular for the purposes of the present invention. It is not required that the edges of the optical flats be polished. The term "optical flat" is used in the same manner, and means the same thing, as the same term known by practitioners of the relevant art of optical flat testing of flat or machined surfaces, such as mechanical seal faces.

As used throughout this disclosure, in reference to the present invention, the expression "reflective means" is used to denote a mirror or mirror-like surface. A good quality glass mirror is generally preferred, though a highly polished reflective metal surface may be employed if it will provide a clear, substantially distortion-free reflection.

FIG. 1 depicts a generalized view of a monochromatic light shining down onto a horizontally-disposed optical flat having a workpiece resting on the optically flat top surface of the optical flat, and a reflective means placed below the optical flat to permit easy viewing of the underside of the optical flat.

FIG. 2 depicts, generally, an embodiment wherein the essential elements of the present invention are conveniently incorporated in a console or box-like cabinet with the light source located in the lid portion, the optical flat located on the top of the box portion of the console, and the reflective means located in a drawer below the optical flat. When in operation, the workpiece to be tested is placed flat-side down on the top surface of the optical flat, the light source is activated, and the drawer is opened sufficiently to allow the operator to view the underside of the optical flat by looking into the front mirror. By having the optical flat and the mirrors in such a console, one may close them up when not in use, thereby helping to protect against dust or damage.

FIG. 3 depicts, generally, an embodiment where the essential elements are conveniently incorporated in operable combination by providing a base on which the optical flat rests, and a support means for attaching the light means above the optical flat, said support means being affixed to the base.

The three figures are discussed more fully below. Obviously other configurations for operably combining the elements of the present invention will be apparent to the practitioners of the relevant arts after reading this disclosure. The present invention is not limited by having the elements fastened directly to each other, but the relative positioning of the light source, the optical flat, and the reflective means is important, regardless of what means are used to hold them in their relative positions during operation according to the present invention.

FIG. 1 depicts, generally, a monochromatic light source (1) positioned to permit the shining of light rays downwardly onto an optical flat (2) having an optically flat surface (2a) facing upward. A reflective means (3) is positioned below the optical flat (2) to permit an easy view of the underside (2b) of the optical flat. FIG. 1 is not to scale and the distances between light source (1) and optical flat (2), and between optical flat (2) and reflective means (3), is not highly critical; it is within the skill of practitioners of the relevant arts to select distances which will provide for easy placement of the workpiece (4) on the optical flat and to allow positioning of the reflective means (3) at an angle to permit easy view of surface (2b). The reflective means (3) is depicted as having an acute angle ($\phi$a) from horizontal so as to permit a person to look downwardly into the reflective means, yet without having to look through the optical flat to see the reflective means and "read" the image there.

FIG. 2 depicts, generally, an embodiment (not to scale) of a closable console or box, shown in cross-section, which is conveniently employed to protect the the monochromatic light source (10), the optical flat (20) and the reflective means which is shown as two mirrors (30) and (31). As depicted, light source (10) is positioned inside lid portion (52) in a manner to shine down onto the optical flat (20) and the workpiece (40) while the lid is in a propped-open position. If it is desired to operate with the lid closed it may be necessary to re-position the light source to a more central location inside the lid. As shown, lid (52) is attached to the lower portion of the console or box (50) by a hinge (51), but other methods of positioning the lid and light source above the optical flat will be apparent to practitioners of the relevant arts. Support means (54) are provided at, or near, the top portion of box (50) on which the optical flat (20) may rest. Below the optical flat there is provided a drawer (53) which is opened during the process of flatness testing, and which may be closed when not in operation. The drawer contains the reflective means, depicted as mirrors (30) and (31) which are adjustable by adjusting means (60) and (61) to control angles ($\phi$) a, b, and c. Other means for adjusting and positioning the mirrors may be used. The drawer may rest on ordinary drawer-glides, depicted, generally, as (55). Electric circuitry for operating the light source is not depicted, but is a part of the light source feature.

FIG. 3 depicts, generally, embodiments which may not be totally contained in a console-type structure as in FIG. 2. FIG. 3 is not to scale, but illustrates that the optical flat (200) is above the reflective means, shown as mirrors (300) and (310), but is below the light source (100). The reflective means, such as mirrors (300) and (310), are conveniently and adjustably mounted inside box or enclosure (500), shown in cross-section, which is open at the top. Optical flat (200) rests at or near the top of the box. Conveniently, the box (500) rests on a base or support (700) and light source (100) is adjustably affixed to, and above, the base by supporting means (800). Adjustability on support means (800) is provided, for example, by slidable adjustment (820) operating in guide means (810). The mirrors (300) and (310) are adjustably mounted to permit adjustment of angles ($\phi$) a, b, and c as needed by the operator of the equipment.

Light rays are shown as beaming down onto the optical flat (200) on which rests the workpiece (400). An optically flat surface (210) of optical flat (200) faces upward and the surface to be tested (410) of workpiece (400) rests against glass surface (210) with only the inevitable, but necessary, air space (420) between them. Light reflected upwardly from mirror (310) is viewed by the operator by looking downwardly into the mirror. Electrical circuitry is not depicted, but is a part of the light source feature.

In FIG. 2 and FIG. 3 the mirrors are depicted as being hinged together along their lower edges. It is within the purview of the present invention to attach the mirrors by other means, but it is preferred that the mirrors do extend downwardly until their lower edges are at least close to each other, if not touching. The mirrors are depicted as resting on the bottom of the compartments in which they are housed, but this is for convenience, not because of necessity; they could be affixed at some distance above the bottom.

In all the attached drawings the thickness of the air spaces (4b, 42, and 420) between the optical flats and the workpieces are exaggerated for illustration purposes. In FIG. 2 and FIG. 3, it is preferred that the inside surfaces of the box or mirror-housing be painted dark, preferably a non-glossy black; this helps in getting a sharp "reading" from the underside of the optical flat.

In practicing the invention, the workpiece is positioned on top of the optical flat with the surface to be tested facing downward. Light rays from a monochromatic light source beam downwardly onto the workpiece and optical flat. At least a portion of the light rays reflect back up through the optical flat to the interface of the workpiece and the optical flat. Most of the reflected light striking the bottom surface of the workpiece and reflecting back down is believed to be light reflected from the mirror, but some is the result of reflection back up through the optical flat from the glass-/air interfaces. The reflecting means are adjusted as needed to permit the operator to view the reflected image of the lower face of the workpiece. As stated previously in this disclosure, the image one sees is a plurality of closely spaced parallel lines on the face of the workpiece; if the workpiece is flat, the lines will be straight but if the workpiece is not flat, the lines will be curved, the extent of curvature correlating to the extent of non-flatness. The "reading" of the image is done the same as with the optical flat testing widely used in the mechanical arts. The optical flat testing method only gives the operator an indication of whether or not the flatness of the workpiece is within acceptable tolerances, but does not, in itself, correct any deficient workpieces. If a workpiece is found to be outside the tolerance range desired, the remedy is usually made by re-lathing, re-grinding, or re-machining the workpiece.

In adjusting the mirrors in FIG. 2 and FIG. 3 the operator will usually find the best angle ($\phi a$) to be about 80° to about 140°, with angles ($\phi b$) and ($\phi c$) being acute angles with respect to horizontal. Angles ($\phi b$) and ($\phi c$) do not have to be equal. In selecting the distances between the light source and optical flat and between the optical flat and mirrors, one should allow enough room to manuever the workpiece and the mirrors, but it is best to avoid distances which are great enough to result in a substantial loss of lumen power from the light source through diffusion into the air.

Other embodiments and refinements may be developed without departing from the scope and purview of the present invention, which is limited only by the following claims, not by the particular embodiments illustrated herein.

I claim:

1. An apparatus useful for determining flatness of a surface, said apparatus comprising in operable combination,
   a monochromatic light source disposed to project light downwardly,
   an optical flat positioned in a substantially horizontal manner, having an optically flat surface facing upwardly toward said light source, and
   a reflective means positioned below the said optical flat to provide a view of the underside of the optical flat,
   wherein the light source, the optical flat and the reflective means are contained within a console having an adjustable lid portion and a lower main portion, the lower portion housing a drawer, with the light source being positioned within the lid portion, the reflective means being positioned within the said drawer in the said lower portion, and the optical flat being positioned above the said drawer.

2. The apparatus of claim 1 wherein the monochromatic light source is a Helium, Sodium, or Mercury vapor lamp.

3. The apparatus of claim 1 wherein the reflective means within the drawer comprises two reflective surfaces, each of which is positioned at an acute angle with respect to the bottom of the drawer, each of which reflective surfaces having a lower edge approximately juxtapositioned with the lower edge of the other reflective surface.

4. The apparatus of claim 3 wherein the reflective surfaces contained within the drawer are adjustably mounted.

5. The apparatus of claim 1 wherein the adjustable lid portion is attached to the lower portion of the console by a hinge means.

6. The apparatus of claim 1 wherein the inside surfaces of the lower portion, except for the reflective means, are dark and non-glossy.

7. The apparatus of claim 1 wherein the adjustable lid portion is attached to the lower portion of the console by an attachment means which permits vertical adjustment with respect to the lower portion.

8. The apparatus of claim 1 wherein the light source is adjustably mounted within the lid portion.

9. The apparatus of claim 1 wherein the drawer is adjustable to be open during use, and to be cloased when not in use.

10. The apparatus of claim 1 wherein the reflective means is a glass mirror.

* * * * *